US012325614B2

(12) United States Patent
Marnier

(10) Patent No.: US 12,325,614 B2
(45) Date of Patent: Jun. 10, 2025

(54) LOAD-HANDLING VEHICLE

(71) Applicant: MANITOU BF, Ancenis (FR)

(72) Inventor: Pierre-Yves Marnier, Ancenis (FR)

(73) Assignee: MANITOU BF, Ancenis (FR)

( * ) Notice: Subject to any disclaimer, the term of this patent is extended or adjusted under 35 U.S.C. 154(b) by 325 days.

(21) Appl. No.: 17/905,058

(22) PCT Filed: Feb. 1, 2021

(86) PCT No.: PCT/FR2021/050178
§ 371 (c)(1),
(2) Date: Aug. 25, 2022

(87) PCT Pub. No.: WO2021/170929
PCT Pub. Date: Sep. 2, 2021

(65) Prior Publication Data

US 2023/0098619 A1 Mar. 30, 2023

(30) Foreign Application Priority Data

Feb. 25, 2020 (FR) .......................................... 2001826

(51) Int. Cl.
*B66F 9/075* (2006.01)
*B66F 9/065* (2006.01)

(52) U.S. Cl.
CPC .......... *B66F 9/0755* (2013.01); *B66F 9/0655* (2013.01)

(58) Field of Classification Search
CPC ............................ B66F 9/0655; B66F 9/0755
See application file for complete search history.

(56) References Cited

U.S. PATENT DOCUMENTS 4,516,116 A * 5/1985 White .................... G01G 23/36 340/685
5,167,287 A * 12/1992 Pomies .................. G01G 19/10 177/139

(Continued)

FOREIGN PATENT DOCUMENTS

EP 2520536 A1 11/2012
EP 2829854 A1 1/2015
FR 2882694 A1 9/2006

OTHER PUBLICATIONS

International Search Report mailed Apr. 28, 2021 for international patent application No. PCT/FR2021/050178.

*Primary Examiner* — Saul Rodriguez
*Assistant Examiner* — Brendan P Tighe
(74) *Attorney, Agent, or Firm* — Husch Blackwell LLP

(57) ABSTRACT

Load-handling vehicle (18) comprising a chassis (2), a pivoting lifting arm (3), a device (13) for measuring the inclination angle (Y) of the arm (3), an accessory (5) which can be positioned at the end of the arm (3), and at least one actuator (61, 62) which is coupled to the chassis (2) and to the arm (3), respectively. The vehicle (I) comprises:—a device (12) for measuring the load (R) exerted by the arm (3) on the pivot pin (4) of the arm (3), —a device (71, 72) for establishing the inclination angle (a; P) of each actuator (61, 62), a device (81, 82) for measuring the load (L; C) exerted by the actuators (61, 62) on the arm (3), —a weighing system (9) which can be activated/deactivated in accordance with the inclination angle (Y) of the arm (3) and comprises a data-processing unit (10) configured, in accordance with the data (R; L; C; Y, α; β,) supplied and the non-loaded weight of the assembly comprising the arm (3) and accessory (5), to establish the weight of the load (18) when the vehicle is loaded.

20 Claims, 3 Drawing Sheets

(56) References Cited

U.S. PATENT DOCUMENTS

| | | | | | |
|---|---|---|---|---|---|
| 5,711,440 | A * | 1/1998 | Wada | B66C 23/905 212/277 |
| 9,630,822 | B2 * | 4/2017 | Ellis | B66F 9/065 |
| 11,226,225 | B2 * | 1/2022 | Sherlock | G01G 23/01 |
| 11,286,648 | B2 * | 3/2022 | Zimmerman | G01G 19/12 |
| 2004/0200644 | A1 * | 10/2004 | Paine | G01G 19/083 177/136 |
| 2015/0027789 | A1 * | 1/2015 | Ellis | G01G 19/083 177/1 |

* cited by examiner

LOAD-HANDLING VEHICLE

The present invention relates to a load-handling vehicle.

It relates in particular to a vehicle for handling a load comprising a chassis, a load-lifting arm mounted on said chassis and able to pivot about an axle, at least one accessory for receiving the load, which accessory can be positioned at the free end of the arm, and at least one actuator coupled to the chassis and to the arm respectively, the, or at least one of the actuators coupled to the chassis and to the arm respectively being a lifting actuator for driving the arm to pivot about its pivot axle connecting it to the chassis.

Load-handling vehicles with a pivoting lifting arm of the type described hereinabove are well known to those versed in this art, as illustrated in particular by patents EP2829854, FR2882694 and EP2520536. There are various weighing systems to make it possible to determine the weight of the load being handled. These weighing systems can be classified into two categories, namely, those integrated into the accessory, and those integrated into the rest of the vehicle. The disadvantage of weighing systems that are integrated into the accessory lies in the fact that, in addition to being of high cost, they reduce the payload of the vehicle. On the other hand, these weighing systems generally have the advantage of being precise. In parallel, weighing systems that are not integrated into the accessory, and that rely for example on the presence of pressure sensors at the actuators, have the disadvantage of being imprecise because they generally do not take account of the position of the center of gravity of the load on the accessory. This imprecision in the weighing may prove to be highly problematical, when the load for example relates to animal feed.

It is an object of the invention to propose a load-handling vehicle the design of which allows precise weighing of the load, at lower cost, and independently of the position of the load carried by the accessory of the vehicle.

To this end, the subject of the invention is a vehicle for handling a load comprising a chassis, a load-lifting arm mounted on said chassis and able to pivot about an axle, a device for measuring or determining at least one parameter representative of the angle of inclination of the arm and corresponding to the angle formed by the arm with respect to the horizontal in the state in which the vehicle is positioned on a horizontal plane, at least one accessory for receiving the load, which accessory can be positioned at the free end of the arm, and at least one actuator coupled to the chassis and to the arm respectively, the, or at least one of the actuators coupled to the chassis and to the arm respectively being a lifting actuator for driving the arm to pivot about its pivot axle connecting it to the chassis, characterized in that said vehicle comprises at least:

- a device for measuring or determining at least one parameter representative of the load generated by the arm on the pivot axle connecting the arm to the chassis,
- a device for determining or measuring the unladen weight of the assembly of arm plus accessory,
- a device for determining or measuring at least one parameter representative of the angle formed by the or each actuator coupled to the chassis and to the arm respectively with the plane via which the vehicle bears on the ground in the state in which the vehicle is positioned on a horizontal plane, and, for the or each actuator, a device for measuring or determining at least one parameter representative of the load of the actuator or actuators,
- an activatable/deactivatable weighing system, said weighing system being activatable as a function of the angle of inclination of the arm, this weighing system comprising a data processing unit configured to, as a function of the data supplied by said devices for determining or measuring, determine, in the unladen state, the weight of the assembly of arm plus accessory and, in the laden state, the weight of the load. The design of the vehicle and, in particular, the data measured or determined make it possible, by employing the fundamental principles of statics to the forces applied to the assembly of arm+accessory+load in a vertical direction, namely along the z-axis in a Galilean frame of reference, to determine the weight of the load being handled, simply and at low cost, without the position of the load on the accessory and the length of the arm in the case of a telescopic arm having an impact on the value of the measured weight of the load.

According to one embodiment of the invention, with the or each actuator coupled to the chassis and to the arm respectively comprising at least a body and a rod with a piston separating the body of the actuator into two chambers, one of them extending on the rod side and the other extending on the opposite side, referred to as the end side, of the actuator, the device for measuring or determining at least one parameter representative of the load of the actuator comprises, for the or each actuator, at least two pressure sensors, one of them positioned in the chamber referred to as the end-side chamber of the actuator and the other positioned in the chamber referred to as the rod-side chamber of the actuator. The presence of pressure sensors thus allows the loads exerted by the actuator or actuators on the arm to be determined in a simple way. As an alternative, just one pressure sensor may be provided, positioned in the end-side chamber of the actuator.

According to one embodiment of the invention, the device for measuring or determining at least one parameter representative of the load generated by the arm on the pivot axle connecting the arm to the chassis comprises at least one strain gauge positioned at the pivot axle connecting the arm to the chassis. This solution is inexpensive compared to a solution involving instrumenting the accessory, and has no influence on the magnitude of the payload of the vehicle.

According to one embodiment of the invention, the device for measuring or determining at least one parameter representative of the angle of inclination of the arm comprises at least one sensor for measuring the angle of inclination of the arm, and the device for determining or measuring at least one parameter representative of the angle formed by the or each actuator with the plane via which the vehicle bears on the ground in the state in which the vehicle is positioned on a horizontal plane comprises at least the sensor for measuring the angle of inclination of the arm. The presence of such an angle measuring sensor may make it possible to dispense with the need for a sensor for measuring the angle formed by the or each actuator coupled to the chassis and to the arm respectively with the plane via which the vehicle bears on the ground in the state in which the vehicle is positioned on a horizontal plane. Thus, the device for measuring or determining at least one parameter representative of the angle of inclination of the arm and the device for determining or measuring at least one parameter representative of the angle formed by the or each actuator with the plane via which the vehicle bears on the ground in the state in which the vehicle is positioned on a horizontal plane may be at least partially common.

According to one embodiment of the invention, the device for determining or measuring at least one parameter representative of the angle formed by the or each actuator with the plane via which the vehicle bears on the ground in the state in which the vehicle is positioned on a horizontal plane comprises a look-up table giving the correlation between the angle of inclination of the arm and the angle formed by the or each actuator with the plane via which the vehicle bears on the ground in the state in which the vehicle is positioned on a horizontal plane. Creating a look-up table makes it possible to dispense with the need for specific measurement devices.

According to one embodiment of the invention, the data processing unit of the weighing system is configured to, as a function of the data supplied by said devices for determining or measuring, determine the weight of the load on the basis of the equation $M=-R-P-L \sin \alpha$ when the vehicle comprises, by way of actuator coupled to the arm and to the chassis respectively, only the lifting actuator, or of the equation $M=-R-P-L \sin \alpha-C \sin \beta$ when the vehicle comprises, by way of actuators coupled to the arm and to the chassis respectively, the lifting actuator and an actuator referred to as a compensating actuator, where

- $\alpha$ corresponds to the angle formed by the lifting actuator with respect to the horizontal in the state in which the vehicle is positioned on a flat horizontal surface,
- $\beta$ corresponds to the angle formed by the compensating actuator with respect to the horizontal in the state in which the vehicle is positioned on a flat horizontal surface,
- R corresponds to the load generated by the arm on the pivot axle connecting the arm to the chassis,
- L corresponds to the load generated by the lifting actuator,
- C corresponds to the load generated by the compensating actuator,
- P corresponds to the unladen weight, which is to say the weight under no load, of the assembly of arm+accessory,
- M corresponds to the weight of the load.

It should be noted that the presence of a compensating actuator is required when the accessory needs to be kept horizontal during the pivoting movement of the arm. In such instances, and as is known per se, the compensating actuator is in fluidic communication with an inclination actuator positioned between the arm and the accessory that is coupled with the ability to pivot to the arm. The follower inclination actuator drives the accessory to pivot in parallel with the actuation of the lead compensating actuator under the effect of the arm being driven to pivot. The application of the fundamental principles of statics in only the vertical direction, as described hereinabove, allows the weight of the load being handled to be determined in a simple way.

According to one embodiment of the invention, the device for determining or measuring the unladen weight of the assembly of arm plus accessory and the processing unit are at least partially common, and the data processing unit of the weighing system is configured to, as a function of at least some of the data supplied by at least some of the devices for determining or measuring, determine the unladen weight of the assembly of arm plus accessory on the basis of the equation $P=-R-L \sin \alpha$ when the vehicle comprises, by way of actuator coupled to the arm and to the chassis respectively, only the lifting actuator, or of the equation $P=-R-L \sin \alpha-C \sin \beta$ when the vehicle comprises, by way of actuators coupled to the arm and to the chassis respectively, the lifting actuator and an actuator referred to as a compensating actuator, where

- $\alpha$ corresponds to the angle formed by the lifting actuator with respect to the horizontal in the state in which the vehicle is positioned on a flat horizontal surface,
- $\beta$ corresponds to the angle formed by the compensating actuator with respect to the horizontal in the state in which the vehicle is positioned on a flat horizontal surface,
- R corresponds to the load generated by the arm on the pivot axle connecting the arm to the chassis,
- L corresponds to the load generated by the lifting actuator,
- C corresponds to the load generated by the compensating actuator,
- P corresponds to the unladen weight, which is to say the weight under no load, of the assembly of arm+accessory. Thus, the accessory can be modified and the invention can be applied to any type of arm.

According to one embodiment of the invention, the weighing system comprises a tare control member that can be actuated by the operator and the data processing unit of the weighing system is configured to determine the unladen weight of the assembly of arm plus accessory as a function of at least some of the data supplied by at least some of the devices for determining or measuring, in the state in which the weighing system is activated and said tare control member is actuated. The tare can thus be set in an easy way.

According to one embodiment of the invention, the weighing system comprises a display configured to display the weight of the load at least in the state in which the weighing system is activated and the tare control member is actuated.

According to one embodiment of the invention, the weighing system comprises a control member for measuring the load which can be actuated by the operator at least in the state in which the weighing system is activated and the tare control member is actuated. The presence of such a load measurement control member allows for subsequent processing of the measured value of the load.

According to one embodiment of the invention, the weighing system comprises a counter configured to increment by a value corresponding to the measured load each time the control member for measuring the load is actuated. This makes it simple for the operator to use.

BRIEF DESCRIPTION OF THE DRAWINGS

The invention will be better understood from reading the following description of some exemplary embodiments, with reference to the attached drawings in which.

Figure 1:
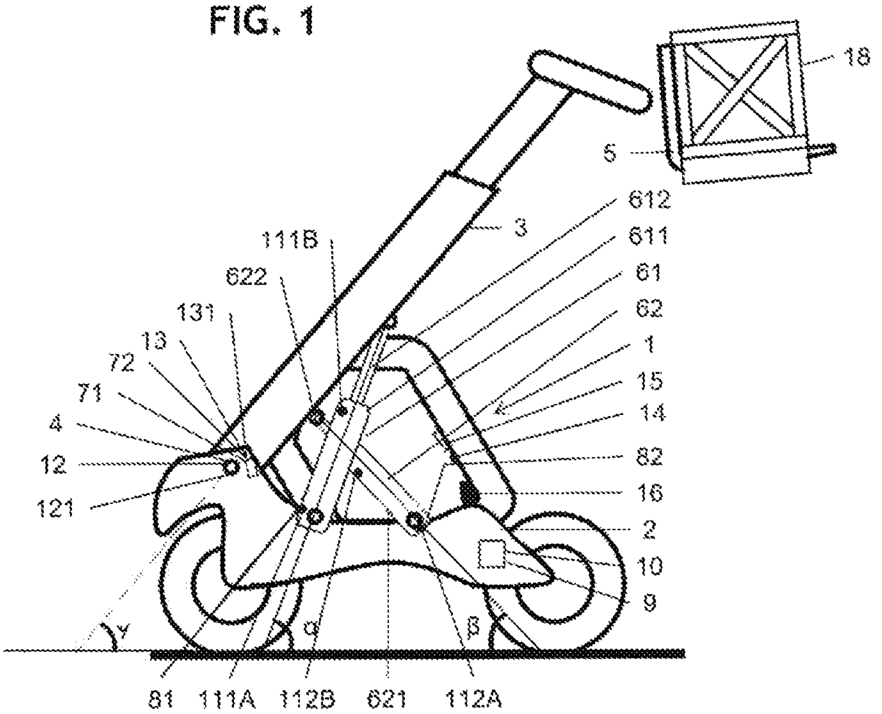
FIG. 1 depicts a simplified schematic view of a load-handling vehicle according to the invention.

As mentioned hereinabove, the invention relates to a load-handling vehicle 1 of the type said to have an arm, of the kind depicted in FIG. 1.

This handling vehicle 1 comprises a mobile chassis 2, such as a wheeled or tracked chassis, equipped with a driver cab for operating the vehicle 1 and with a propulsion unit, not depicted, for driving the movement of the vehicle along the ground. The propulsion unit may comprise a combustion engine, itself associated with a hydraulic pump, not depicted, able to supply fluid to one or more actuators which will be described hereinafter.

The vehicle 1 comprises a load-lifting arm 3 supported by the chassis 2. This lifting arm 3 may be a telescopic arm of variable length as in the example depicted, or an arm of fixed length.

This arm 3 is a pivoting arm mounted with the ability to pivot about an axis said to be horizontal, orthogonal to the longitudinal axis of the arm 3 and parallel to the plane via which the vehicle bears on the ground, in the state in which the vehicle is positioned on a flat horizontal surface for moving the arm 3 from a lowered position to a raised position and vice versa.

Said vehicle 1 further comprises an accessory 5 for receiving the load 18 that can be positioned at the free end of the arm 3, which is to say at the opposite end of the arm from the one pivotably coupled to the chassis 2.

This accessory 5 may be formed of a bucket, of forks as in the example depicted in FIG. 1, or in some other form. This accessory 5 may be coupled to the arm 3 in a fixed or mobile manner.

The vehicle 1 further comprises one or more hydraulic actuators coupled to the arm 3 and to the chassis 2 respectively. In instances in which the vehicle 1 comprises just one single actuator between the arm 3 and the chassis 2, this actuator 61 is a lifting actuator 61 for raising the arm 3 to move the arm from a lowered position to a raised position by making the arm 3 pivot about its pivot axle 4 that connects it to the chassis 2.

In the case of a plurality of actuators, each coupled to the chassis 2 and to the arm 3 respectively, the other or another of the actuators depicted as 62 in the figures is referred to as a compensating actuator 62. This compensating actuator 62 is in fluidic communication with an inclination actuator positioned between the arm 3 and the accessory 5, this inclination actuator allowing the accessory to be kept horizontal as the arm 3 is raised, particularly when this accessory is forks. This inclination actuator is a follower actuator as compared with the compensating actuator 62 which is the lead actuator. The compensating actuator 62 is itself actuated as a function of the movement of the lifting arm 3 by the lifting actuator 61.

Obviously, the compensating actuator 62 and the associated inclination actuator are not present when the accessory is mounted in a fixed position at the end of the lifting arm 3.

The lifting actuator 61 is controlled in its operation using an operating member such as a joystick positioned inside the driver cab of the vehicle 1 in the way known per se.

In the examples depicted, the lifting actuator 61 comprises a body 611 and a rod 612 with a piston separating the body 611 of the actuator into two chambers, one of them extending on the rod side and the other on the opposite side, referred to as the end side, of the lifting actuator 61.

Likewise, the compensating actuator 62 comprises a body 621 and a rod 622 with a piston separating the body 621 of the compensating actuator into two chambers, one of them extending on the rod side and the other on the opposite side, referred to as the end side, of the compensating actuator 62.

The lifting actuator 61 makes an angle α with the plane via which the vehicle 1 bears on the ground in the state in which the vehicle 1 is positioned on a horizontal plane. This angle α therefore corresponds to the angle of inclination of the lifting actuator 61 with respect to the horizontal. This angle α is an acute angle.

Likewise, the compensating actuator 62, when present, forms an angle β with the plane via which the vehicle 1 bears on the ground in the state in which the vehicle 1 is positioned on a horizontal plane. This angle β therefore forms the angle of inclination with respect to the horizontal of the compensating actuator 62. This angle β is an acute angle.

The arm 3 itself makes an angle, referred to as an angle of inclination, depicted as Y in the figures, this angle corresponding to the angle formed by the arm 3, particularly the longitudinal axis of the arm 3, with the plane via which the vehicle 1 bears on the ground in the state in which the vehicle 1 is positioned on a horizontal plane.

The vehicle 1 comprises a device 13 for measuring or determining at least one parameter representative of this angle Y of inclination of the arm 3.

In the examples depicted, this device 13 for measuring or determining the angle Y of inclination of the arm 3 comprises a sensor for measuring said angle and indicated as 131 in the figures.

The vehicle 1 further comprises a device 71 for determining or measuring a parameter representative of the angle α formed by the lifting actuator 61 with the plane via which the vehicle bears on the ground in the state in which the vehicle is positioned on a horizontal plane, and a device 72 for determining or measuring a parameter representative of the angle β formed by the compensating actuator 62 with the plane via which the vehicle bears on the ground in the state in which the vehicle is positioned on a horizontal plane.

The device 71 for determining or measuring a parameter representative of the angle α formed by the lifting actuator 61 may be formed directly by an angle measurement sensor positioned at the lifting actuator 61. The same may be true of the device 72 for determining or measuring a parameter representative of the angle β formed by the compensating actuator 62 where, once again, the device may be formed directly by an angle measuring sensor positioned at the compensating actuator 62. In that case, the angles α and β are measured. In the alternative, the angles α and β may be determined.

In this embodiment, the device 71 for determining or measuring a parameter representative of the angle α formed by the lifting actuator 61 and the device 72 for determining or measuring a parameter representative of the angle β formed by the compensating actuator 62, when present, may be partially common and comprise at least the sensor 13 for measuring the angle Y of inclination of the arm 3.

The device 71 for determining or measuring a parameter representative of the angle α formed by the lifting actuator 61 further comprises a table referred to as a look-up table which gives the correlation between each measured angle Y and the value of an angle α, it being possible for this look-up table to be established either empirically or by construction. This look-up table can be stored in memory in a memory of a data processing unit of the weighing system 9 that will be described hereinafter.

Similarly, the device 72 for determining or measuring a parameter representative of the angle β formed by the compensating actuator 62 when present comprises a table referred to as a look-up table giving the correlation between each measured angle Y of inclination of the arm and the value of an angle β, it being possible for this look-up table to be established either empirically or by construction and it being possible for this look-up table to be stored in memory in a memory of a data processing unit 10 of the weighing system 9 that will be described hereinafter.

Obviously, a solution in which the angles α and β of the lifting and compensating actuators are measured using angle sensors in order to determine, on the basis of said values, the angle Y of inclination of the arm can also be envisioned.

Likewise, it is possible to envision using length-measuring sensors to determine the lengths of the lifting and compensating actuators and to determine, as a function of said measurements, the values of angles by applying the rules of trigonometry.

The vehicle 1 further comprises a device 81 for measuring or determining a parameter representative of the load L of the lifting actuator 61 on the arm 3 and the chassis and, in the case of the compensating actuator 62 when present, a device 82 for measuring or determining a parameter representative of the load C of the compensating actuator 62 on the arm 3 and the chassis.

The device 81 for measuring or determining a parameter representative of the load L of the lifting actuator 61 comprises at least one and preferably at least two pressure sensors, namely one, depicted as 111A, in the end-side chamber of the lifting actuator 61 and the other, depicted as 111B, in the rod-side chamber of the lifting actuator 61. The load L of the lifting actuator is therefore determined by calculation using the formula $L=P1\times S1-P2\times S2$ where P1 corresponds to the pressure in the end-side chamber of the lifting actuator 61, P2 to the pressure in the rod-side chamber of the lifting actuator 61, S1 to the surface area of the piston on the end side of the lifting actuator 61 and S2 to the annular surface area of the piston on the rod side of the lifting actuator 61.

Similarly, the device 82 for measuring or determining a parameter representative of the load C of the compensating actuator 62 comprises at least one and preferably at least two pressure sensors one of them, indicated as 112A, positioned in the end-side chamber of the compensating actuator 62 and the other, indicated as 112B, positioned in the rod-side chamber of the compensating actuator 62. The load C of the compensating actuator is therefore determined by calculation using the formula $C=P1\times S1-P2\times S2$ where P1 corresponds to the pressure in the end-side chamber of the compensating actuator 62, P2 to the pressure in the rod-side chamber of the compensating actuator 62, S1 to the surface area of the piston on the end side of the compensating actuator 62 and S2 to the annular surface area of the piston on the rod side of the compensating actuator 62.

The vehicle 1 further comprises a device 12 for measuring or determining a parameter representative of the load R generated by the arm 3 on the pivot axle 4 that connects the arm 3 to the chassis 2.

This device 12 for measuring or determining at least a parameter representative of the load R generated by the arm 3 on the pivot axle 4 connecting the arm 3 to the chassis 2 comprises at least one strain gauge 121 positioned at the pivot axle 4 connecting the arm 3 to the chassis 2. This strain gauge is integrated into said pivot connection to form a load cell sensor. The parameter measured takes account of the assembly of arm+accessory+load.

The vehicle 1 further comprises an activatable/deactivatable weighing system 9. This weighing system 9 can be activated as a function of the angle Y of inclination of the arm 3 corresponding to the angle formed by the arm, with respect to the horizontal, in the state in which the vehicle 1 is positioned on a horizontal plane, and is configured to be activated when the angle Y of inclination of the arm is greater than a predetermined value. The objective of this is to perform a weighing action when the accessory 1 is not bearing on the ground, so as not to falsify the measurement.

The activation may be performed automatically as soon as the angle Y of inclination of the arm is greater than said predetermined value. Activation may also be performed manually, by manual actuation of an activation member, provided that the angle Y of inclination of the arm is greater than said predetermined value.

This weighing system 9 comprises a processing unit 10. This processing unit 10 is notably configured to receive as input the value of the angle Y of inclination of the arm 3 and to compare this measured value against a predetermined and stored threshold value for the angle of inclination in order to determine, as a function of the result of the comparison, whether or not the weighing system is activated.

Specifically, said data processing unit 10 takes the form of an electronic and computerized system which for example comprises a microprocessor and a working memory. According to one particular aspect, the data processing unit 10 may take the form of a programmable controller.

In other words, the functions and steps described can be implemented in the form of a computer program or using hardware components (for example programmable gate arrays). In particular, the functions and steps performed by the processing unit or the modules thereof can be performed by sets of instructions or computer modules implemented in a processor or a controller or may be performed by dedicated electronic components or components of the FPGA or ASIC type. It is also possible to combine computer portions and electronic portions.

When it is specified that the unit or means or modules of said unit are configured to perform a given operation, that means that the unit comprises computer instructions and the corresponding means of execution to allow said operation to be performed and/or that the unit comprises corresponding electronic components.

The vehicle 1 further comprises a device 19 for determining or measuring the unladen weight P of the assembly of arm 3 plus accessory 5. This device 19 for determining or measuring the unladen weight P may be at least partially common to the data processing unit 10 of the weighing system 9.

In that case, the data processing unit 10 can be configured so that, in the state in which the weighing system 9 is activated and as a function of the data R, L, C, Y, $\alpha$, $\beta$ supplied by said devices 12, 71, 72, 81, 82 for determining or measuring as described hereinabove, other than the device 19 for determining or measuring the unladen weight P, this data processing unit determines, when unladen, the weight of the assembly of arm plus accessory and determines, under load, the weight of the load 18.

In particular, the determination when unladen and when under load may be performed successively when the weighing system 9 is in the activated state.

The weighing system 9 comprises a tare control member 14 that can be actuated by the operator. This control member 14, positioned in the driver cab, may take the form of a switch, a button, a push-button or the like.

The data processing unit 10 of the weighing system 9 is configured so that, as a function of the data R, L, C, Y, $\alpha$, $\beta$ supplied by said devices 12, 71, 72, 81 and 82 for determining or measuring, it determines the unladen weight P of the assembly of arm plus accessory, preferably on the basis of the equation $P=-R-L \sin \alpha$ when the vehicle 1 comprises, by way of actuator coupled to the arm 3 and to the chassis 2 respectively, only the lifting actuator 61, or of the equation $P=-R-L \sin \alpha-C \sin \beta$ when the vehicle 1 comprises, by way of actuators coupled to the arm 3 and to the chassis 2 respectively, the lifting actuator 61 and a compensating actuator 62 where a corresponds to the angle formed by the lifting actuator 61 with the horizontal in the state in which the vehicle 1 is positioned on a flat horizontal surface, $\beta$ corresponds to the angle formed by the compensating actuator 62 with the horizontal in the state in which the vehicle 1 is positioned on a flat horizontal surface, R corresponds to the load generated by the arm 3 on the pivot axle 4 connecting the arm 3 to the chassis 2, L corresponds to the load generated by the lifting actuator 61, C corresponds to the load generated by the compensating actuator 62 and P corresponds to the unladen weight, which is to say the weight under no load, of the assembly of arm+accessory.

The weighing system 9 comprises a display 15 such as a screen positioned in the driver cab of the vehicle 1.

This display 15 is in communication with the data processing unit 10 and is configured to display the weight of the load 18 at least in the state in which the weighing system 9 is activated and the tare control member 14 is actuated.

If necessary, the weighing system 9 comprises a control member 16 for measuring the load 18 which can be actuated by the operator, at least in the state in which the weighing system 9 is activated and the tare control member 14 is actuated.

Once again, this control member 16 is positioned in the driver cab of the vehicle and may take the form of a button or the like.

Generally, the weighing system 9 comprises a counter 17 configured to be incremented by a value corresponding to the measured load each time the control member 16 for measuring the load 18 is actuated. This counter 17 is placed in the driver cab.

As mentioned hereinabove, it is the data processing unit 10 that is at least partially common with the device 19 for determining or measuring the unladen weight of the assembly that makes it possible, as a function of at least some of the data supplied by at least some of the other determining or measuring devices 71, 72, 81, 82, 12 described above, to determine the unladen weight of the assembly of arm plus accessory and the weight of the load.

Figure 2:
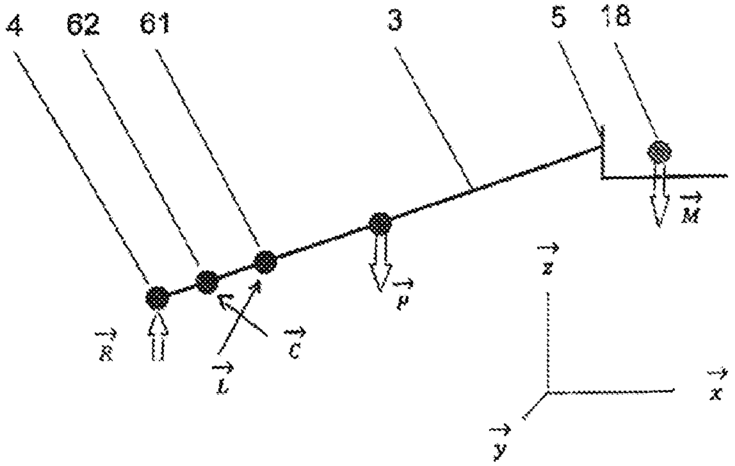
FIG. 2 depicts a schematic depiction of the assembly of arm+accessory+load and of the forces liable to be applied to said assembly.
Figure 3:
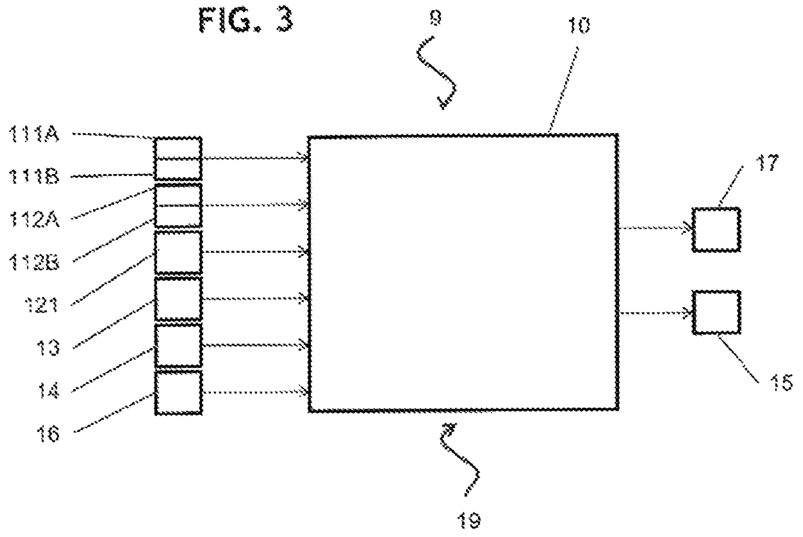
FIG. 3 depicts, in the form of blocks, the data processing unit and the inputs and outputs of said processing unit.

In general, on the basis of the fundamental principles of statics, use is made of the equation $\Sigma$ (force. $\vec{z}$)=0. $\vec{z}$, which amounts to considering, on the basis of the diagram of FIG. 2, that $\hat{R}+\vec{L}+\vec{C}+\vec{P}+\vec{M}=\vec{0}$. In $\vec{z}$, it is therefore considered that $R+P+M+L \sin\alpha+C \sin\beta=0$ when the vehicle comprises a lifting actuator 61 and a compensating actuator 62 or that $R+P+M+L \sin\alpha=0$ when the vehicle comprises only a lifting actuator 61, where M corresponds to the weight of the load and the parameters $\alpha$, $\beta$, R, L, C, P correspond to the elements described above.

As a variant, the unladen weight P of the assembly of arm+accessory could be defined by construction. In that case, the device 19 for determining or measuring the unladen weight of the assembly of arm 3 plus accessory 5 comprises a memory in which said data is stored and which if necessary is associated with a man/machine interface for inputting said data into the memory. However, the solution of determining the unladen weight P by calculation in the context of a tare-setting operation as described hereinabove is preferred. In this embodiment, the unladen weight, which is to say the weight in the absence of load, of the assembly of arm plus accessory is determined first of all at the time of tare-setting. To do this, the equation is applied with M=0. From this it will therefore be deduced that $P=-R-L \sin\alpha-C \sin\beta$ or that $P=-R-L \sin\alpha$ when the vehicle comprises only a lifting actuator 61. This equation is applied in the state in which the tare control member 14 is actuated, as mentioned hereinabove.

Once the tare has been set and P has been determined, the weight of the load can be determined on the basis of the above equations.

In practice, the operator generally proceeds as follows: they connect an accessory to the arm of the vehicle, they actuate the arm in order to raise the accessory, so that the arm is supported only by the actuators, and the accessory and the arms are free of direct contact with the ground. The weighing system 9 is then either activated automatically in this position or activated by the operator actuating a control member.

On flat ground with the vehicle stationary or advancing at a slow and even pace, the operator actuates the tare control member 14. Once the tare has been set, the operator loads their accessory with the load 18 that is to be handled. The display continuously displays the weight of the load added into or onto the accessory. Once the load weight value has been displayed and stabilized, the operator can validate the weight of the load by actuating the load measuring control member 16. The counter increments by said value.

A new weighing operation can be performed after the load has been offloaded and, if necessary, a further tare-setting operation has been performed.

Obviously, when the unladen weight of the assembly of arm+accessory is considered to be a predefined memory-stored constant, the weight of the load can be determined without performing a tare-setting operation.

The invention claimed is:

1. A vehicle for handling a load the vehicle comprising:

a chassis;

a load-lifting arm mounted on the chassis and able to pivot about a pivot axle;

a first device designed to determine a first parameter representative of an angle (Y) of inclination of the arm and corresponding to the angle (Y) formed by the arm with respect to a horizontal plane, wherein the vehicle is positioned on the horizontal plane;

an accessory for receiving the load, the accessory being positioned at a free end of the arm;

an actuator coupled to the chassis and to the arm, the actuator being a lifting actuator designed to drive the arm to pivot about the pivot axle connecting the arm to the chassis; or a compensating actuator;

a second device designed to determine a second parameter representative of a force (R) generated by the arm on the axle connecting the arm to the chassis;

a third device designed to determine a third parameter representative of a combined unladen weight (P) of the arm and the accessory;

a fourth device designed to determine a fourth parameter representative of an angle ($\alpha$) formed by the lifting actuator with the horizontal plane or an angle ($\beta$) formed by the compensating actuator with the horizontal plane;

a fifth device designed to determine a fifth parameter representative of one of a second load generated by the lifting actuator (L) or a third load generated by the compensating actuator (C); and a weighing system, the weighing system being activatable as a function of the angle (Y), the weighing system comprising a data processing unit configured to determine a weight (M) of the load as a function of one or more of the second parameter, the third parameter, the fourth parameter or the fifth parameter supplied by one or more of the second device, the third device, the fourth device, or the fifth device.

2. The vehicle of claim 1, wherein one or more of the lifting actuator and the compensating actuator comprises a body and a rod with a piston, the piston separating the body of the actuator into a first chamber and a second chamber, the first chamber extending on a piston side of the actuator and the second chamber extending on an end side of the actuator, the fifth device comprising a first pressure sensor positioned in the first chamber of the end side and a second pressure sensor positioned in the second chamber of the rod side.

3. The vehicle of claim 1, wherein the second device comprises at least one strain gauge positioned at the pivot axle connecting the arm to the chassis.

4. The vehicle of claim 1, wherein the first device comprises a sensor for measuring the angle (Y), and wherein the fourth device comprises the sensor.

5. The vehicle of claim 4, wherein the fourth device comprises a look-up table giving a correlation between the angle (Y) and either of the angles (α) or (β).

6. The vehicle of claim 1, wherein the data processing unit of the weighing system is configured to determine the weight of the load as a function of one or more of the first parameter, the second parameter, the third parameter, or the fourth parameter based on a first equation;

weight M=−(force R)−unladen weight P−second load L*sin (angle α) when the vehicle comprises the lifting actuator coupled to the arm and to the chassis or a second equation:

weight M=−(force R)−unladen weight P−second load L*sin (angle α)−third load C*sin (angle β) when the vehicle comprises the lifting actuator and the compensating actuator coupled to the arm and to the chassis.

7. The vehicle of claim 1, wherein the third device and the data processing unit are at least partially common, and wherein the data processing unit is configured to determine the unladen weight (P) as a function of one or more of the first parameter, the second parameter, the third parameter, or the fourth parameter based on a third equation:

unladen weight P=−(force R)−second load L*sin (angle α) when the vehicle comprises the lifting actuator or a fourth equation:

unladen weight P=−(force R)−second load L*sin (angle α)−third load C*sin (angle β) when the vehicle comprises the lifting actuator and the compensating actuators.

8. The vehicle of claim 1, wherein the weighing system comprises a tare control member that can be actuated by an operator and wherein the data processing unit is configured to determine the unladen weight (P) as a function of one or more of the first parameter, the second parameter, the third parameter, or the fourth parameter in a state in which the weighing system is activated and the tare control member is actuated.

9. The vehicle of claim 8, wherein the weighing system comprises a display configured to display the weight of the load at least in the state in which the weighing system is activated and the tare control member is actuated.

10. The vehicle of claim 8, wherein the weighing system comprises a control member for measuring the load, which can be actuated by the operator at least in the state in which the weighing system is activated and the tare control member is actuated.

11. The vehicle of claim 10, wherein the weighing system comprises a counter configured to increment by a value corresponding to a measured load each time the control member for measuring the load is actuated.

12. A weighing system for a vehicle handling a weighted load, the weighing system comprising:

a first device designed to determine a first parameter representative of a first load (R) generated by an arm of the vehicle on an axle connecting the arm to a chassis of the vehicle;

a second device designed to determine a second parameter representative of one of:

a first angle (α) formed by a lifting actuator and a horizontal plane via which the vehicle bears on a ground, the lifting actuator being coupled to the chassis and the arm, or a second angle (β) formed by a compensating actuator and the horizontal plane, the compensating actuator being coupled to the chassis and the arm;

a third device designed to determine a third parameter representative of one of:

a second load (L) of the lifting actuator, or a third load (C) of the compensating actuator;

a fourth device designed to determine a fourth parameter representative of a combined unladen weight (P) of the arm and an accessory for receiving the weighted load, the accessory positioned at an end of the arm; and a data processing unit designed to determine a weight of the weighted load as a function of one or more of the first parameter, the second parameter, the third parameter, and the fourth parameter, wherein the weighing system is activated as a function of a third angle (Y) of inclination between the arm and the horizontal plane.

13. The weighing system of claim 12, wherein the third angle (Y) is determined via a look-up table containing a correlation between the first angle (α) and the third angle (Y).

14. The weighing system of claim 12, wherein the third angle (Y) is determined via a look-up table containing a correlation between the second angle (β) and the third angle (Y).

15. The weighing system of claim 12, further comprising one or more of a first length-measuring sensor coupled to the lifting actuator or a second length-measuring sensor coupled to the compensating actuator, wherein the data processing unit determines the first angle (α) using a first length value measured by the first length-measuring sensor and the data processing unit determines the second angle (β) using a second length value measured by the second length-measuring sensor.

16. The weighing system of claim 12, wherein the lifting actuator further comprises a body and a rod with a piston, the piston separating the body of the lifting actuator into a first chamber and a second chamber.

17. The weighing system of claim 16, wherein the data processing unit determines the second load (L) based on a first equation:

$$\text{the second load } (L) = P1 \times S1 - P2 \times S2$$

wherein P1 corresponds to a first pressure in the first chamber, P2 corresponds to a second pressure in the second chamber, S1 corresponds to a first surface area of a first side of the piston facing the first chamber, and S2 corresponds to a second surface area of a second side of the piston facing the second chamber.

18. The weighing system of claim 12, wherein the compensating actuator further comprises a body and a rod with a piston, the piston separating the body of the compensating actuator into a third chamber and a fourth chamber.

19. The weighing system of claim 18, wherein the data processing unit determines the third load (C) based on a second equation:

$$\text{the third load } (C) = P3 \times S3 - P4 \times S4$$

wherein P3 corresponds to a third pressure in the third chamber, P4 corresponds to a fourth pressure in the fourth chamber, S3 corresponds to a third surface area of a third side of the piston facing the third chamber, and S4 corresponds to a fourth surface area of a fourth side of the piston facing the fourth chamber.

20. The weighing system of claim 12, wherein the weighing system is also activatable by manually actuating an activation member.

* * * * *